(12) United States Patent
Lauk et al.

(10) Patent No.: US 6,639,335 B1
(45) Date of Patent: Oct. 28, 2003

(54) ELECTRIC-MOTOR DRIVE DEVICE

(75) Inventors: Detlef Lauk, Renchen (DE); Ernst Fischer, Gernsbach (DE); Hansjoerg Karcher, Buehlertal (DE); Juergen Herp, Buehl (DE); Erik Maurer, Nuehlertal (DE); Andreas Wiegert, Kappelrodeck (DE); Richard Hurst, Offenburg (DE); Anton Waibel, Hagnau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/555,376

(22) PCT Filed: Jul. 20, 1999

(86) PCT No.: PCT/DE99/02239

§ 371 (c)(1),
(2), (4) Date: Aug. 25, 2000

(87) PCT Pub. No.: WO00/19583

PCT Pub. Date: Apr. 6, 2000

(30) Foreign Application Priority Data

Sep. 29, 1998 (DE) .......................................... 198 44 601

(51) Int. Cl.$^7$ .............................. H02K 5/00; H02K 7/00
(52) U.S. Cl. ........................................... 310/89; 310/83

(58) Field of Search ......................... 310/89, 83, 90.5; H02K 5/00, 7/10

(56) References Cited

U.S. PATENT DOCUMENTS

| | | | | |
|---|---|---|---|---|
| 3,132,366 A | * | 5/1964 | Brooks ......................... | 310/83 |
| 3,707,037 A | * | 12/1972 | Gutris ......................... | 310/89 |
| 4,488,073 A | * | 12/1984 | Morishita .................... | 310/83 |
| 4,694,211 A | * | 9/1987 | Bayha et al. ................. | 310/87 |

FOREIGN PATENT DOCUMENTS

EP     0626747 A    * 12/1994    ............ H02K/5/10

* cited by examiner

Primary Examiner—Nestor Ramirez
Assistant Examiner—Karen Addison
(74) Attorney, Agent, or Firm—Ronald E. Greigg

(57) ABSTRACT

In an electric-motor drive device for auxiliary devices in motor vehicles, such as sliding roofs, window controls, windshield wipers, and the like, having a gear housing (17) and a cup-shaped motor housing (13) that is slipped with its opening edge (131) onto the gear housing (17) and fixed thereon, to reduce manufacturing costs and the requisite installation space and improve force introduction from the motor housing (13) to the gear housing (17), the motor housing (13), in its slip-on region, is roller-burnished into the gear housing (17).

12 Claims, 1 Drawing Sheet

ELECTRIC-MOTOR DRIVE DEVICE

BACKGROUND OF THE INVENTION

1. Field of the Invention

The invention relates to electric-motor drive devices and more particularly to improve electric motor drives for auxiliary devices in motor vehicles, such as sliding roofs, window controls, windshield wipers, and the like,.

2. Description of the Prior Art

In a known drive device of this type disclosed in German Utility Model DE 92 06 269 U1, the cup-shaped or cap-shaped motor housing is slipped onto a cylindrical post of the gear to housing; the edge of its cap is covered by an annular flange embodied on the post. Between the edge of the cap and the annular flange, there is a sealing ring.

In another known drive device disclosed in German Patent Disclosure DE 25 56 240 A1, the fixation of the gear housing and motor housing to one another is done by providing each housing with a radial shoulder, which after the two housings have been joined together is located spaced apart from and in front of the shoulder of the other housing, and a fastening element that has clamping faces cooperating in wedgelike fashion with the shoulders clamps the two housings together.

SUMMARY OF THE INVENTION

The drive device of the invention has the advantage over the prior art that production is simplified and thus made less expensive by eliminating the shoulders, which have to be formed separately on the housings, and the loose fastening element. Also eliminated are elements protruding past the outside diameter of the housings, so that the requisite installation space for the drive device is reduced. Roller-burnishing according to the invention assures an improved introduction of force from the motor housing to the gear housing and a rigid connection between the housings, with a favorable effect on noise produced by the drive device. At the same time, by the large-area, intimate bond between the housings that is attained, an improved heat transfer from the motor housing to the gear housing and thus improved heat dissipation from the motor are attained. Furthermore, the roller-burnished connection brings about good sealing at the transition between the two housings. Roller-burnishing has been set forth in U.S. Pat. No. 6,056,263 column 2, line 61 through column 3, line 44, which is incorporated herein by reference.

In a preferred embodiment of the invention, the roller-burnishing is performed at two points, longitudinally spaced apart from one another, in the slip-on region of the motor housing onto the gear housing. This creates a very reliable connection, in which for long periods, even under extreme operating conditions, no play can occur between the two housings.

In an advantageous embodiment of the invention, the gear housing, in the slip-on region of the motor housing, has an annular groove into which an encompassing annular bead, stamped out of the motor housing by roller-burnishing, protrudes with positive engagement. The provision of the annular groove makes it easier to press the motor housing material into the gear housing, and only much-reduced roller-burnishing forces are required. A good positive engagement connection is created between the annular groove and the annular bead.

Greater strength of this connection is attained whenever, in accordance with an advantageous embodiment of the invention, on the gear housing in the motor housing slip-on region, an encompassing radial shoulder remote from the motor housing is additionally embodied, and the radial shoulder is engaged from behind by an annular collar bent inward from the motor housing by roller-burnishing. The motor housing is then fixed on the gear housing at two spaced-apart points.

BRIEF DESCRIPTION OF THE DRAWING

The above features and advantages of the invention will be apparent from the detailed description contained herein below, taken in conjunction with the drawing, in which.

DESCRIPTION OF THE EXEMPLARY EMBODIMENTS

Figure 1:
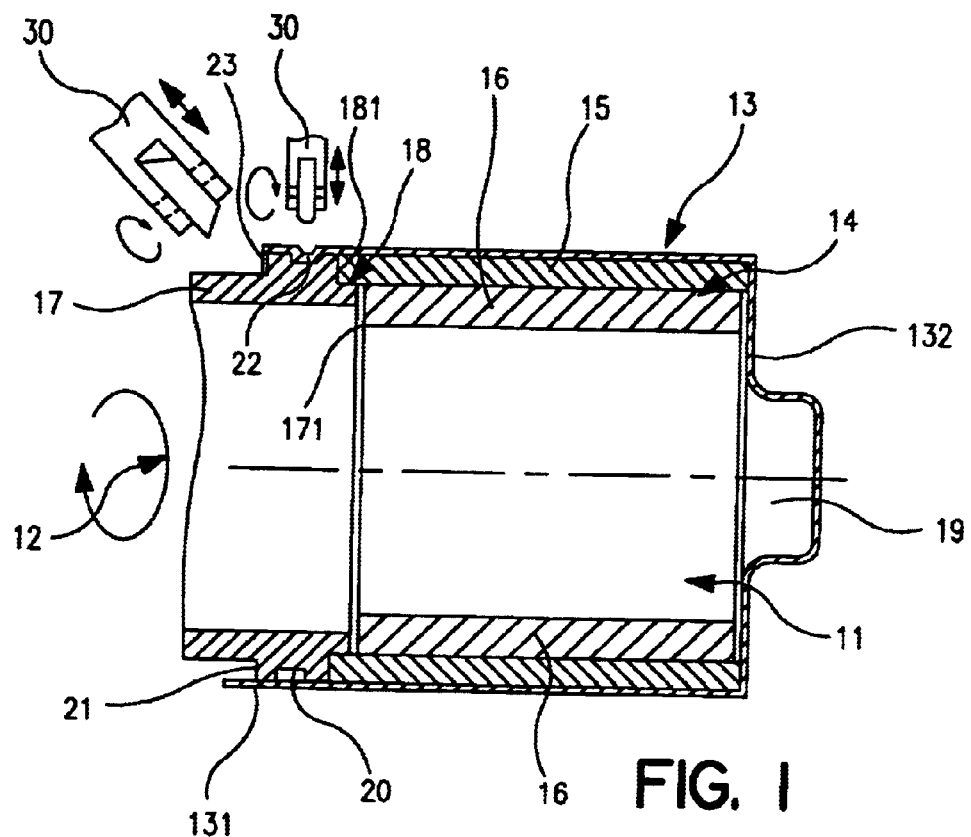
FIGS. 1 and 2, each in fragmentary form, show an electric-motor drive device for auxiliary devices in motor vehicles, in accordance with a first and second exemplary embodiment, respectively.
Figure 2:
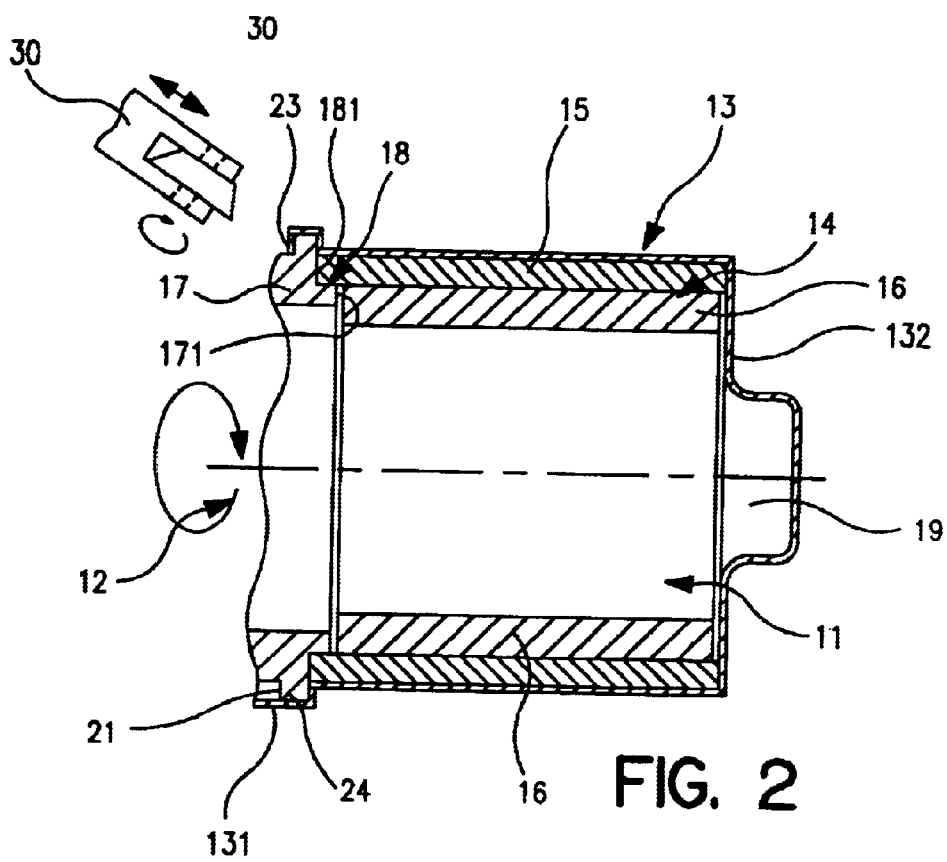

The electric-motor drive device, shown in fragmentary form in each of FIGS. 1 and 2, for instance for adjusting sliding roofs, window controls, vehicle seats, and the like in motor vehicles, has an electric motor 11 and for stepping down the motor rpm a gear 12, preferably a worm gear. All that can be seen of the electric motor 11 in FIGS. 1 and 2 is the motor housing 13 and the stator 14 that is enclosed by the motor housing 13; in a known manner, the stator comprises a short-circuit ring 15 and permanent magnet segments 16 secured to it. All that can be seen of the gear 12 is the gear housing 17 in fragmentary form. The cap-shaped or cup-shaped motor housing 13, also known as a pole pot, is slipped with its opening edge 131 onto the gear housing 17 and roller-burnished into the gear housing 17 in the slip-on region at two longitudinally spaced apart points. An encompassing, angular chamfer 18 is made by turning into the face end 171 of the gear housing 17 toward the motor housing 13, and the short-circuit ring 15 is slipped by positive engagement onto the chamfer until its annular end face meets the radial leg face 181 of the chamfer 18. A cap-shaped indentation 19 is coaxially recessed out of the bottom 132 of the cup-shaped motor housing 13 and serves to receive a bearing for the rotor shaft of the electric motor 11.

In the exemplary embodiment of FIG. 1, in the slip-on region of the motor housing 13, an annular groove 20 on the one hand and an encompassing radial shoulder 21 on the other, which points away from the motor housing 13, are formed in the gear housing 17. By placing a roller-burnishing tool 30; as shown in FIG. 1 against the motor housing 13 in the region of the annular groove 20, an encompassing annular bead 22 is stamped out of the motor housing 13; it protrudes with positive engagement into the annular groove 20. By placing the roller-burnishing tool 30' against the end portion of the opening edge 131 of the motor housing 13 behind the radial shoulder 21, an inward-bent annular collar 23 is created, which engages the radial shoulder 21 from behind. By means of these two roller-burnishing operations, the motor housing 13 is joined solidly and permanently to the gear housing 17.

In the exemplary embodiment of FIG. 2, the annular groove for roller-burnishing in of an annular bead is dispensed with, and instead, an annular rib 24 protruding radially from the outer circumference of the gear housing is machined out of the slip-on region of the motor housing 13 on the gear housing 17, and one annular rib face forms the radial shoulder 21 and the other annular rib face forms an extension of the radial leg face 181 of the chamfer 18. On its opening edge 131 toward the gear housing 17, the motor housing 13 is radially widened, and once the annular collar 23 that engages the radial shoulder 21 from behind has been made by roller-burnishing tool 30', the motor housing is braced on both annular rib faces of the annular rib 24.

In both FIGS. 1 and 2, the lower half of the drawing shows the state before the roller-burnishing and the upper half of the drawing shows the state after the roller-burnishing.

The foregoing relates to preferred exemplary embodiments of the invention, it being understood that other variants and embodiments are thereof possible within the spirit and scope of the invention, the latter being defined by the appended claims.

We claim:

1. An electric-motor drive device for auxiliary devices in motor vehicles, such as sliding roofs, window controls, windshield wipers, and the like, having a metal gear housing (17) and a metal cup-shaped motor housing (13) that is slipped with an opening edge (131) onto the gear housing (17) and fixed thereon, the improvement wherein the slipped-on region of the motor housing (13) that fits over the gear housing (17), is roller-burnished into the gear housing (17), wherein the roller-burnishing is done at two points axially spaced apart from one another with two different roller-burnishing tools.

2. The drive device of claim 1, wherein the gear housing (17), in the slipped-on region of the motor housing (13), has an annular groove (20) into which an encompassing annular bead (22), stamped out of the motor housing (13) by the roller-burnishing, protrudes with positive engagement.

3. The drive device of claim 1, wherein on the gear housing (17) in the motor housing slipped-on region, an encompassing radial shoulder (21) remote from the motor housing (13) is embodied, which is engaged from behind by an annular collar (23) bent inward from the motor housing (13) by the roller-burnishing.

4. The drive device of claim 1, wherein the motor housing (13) encloses a stator (14), which comprises a short-circuit ring (15) and permanent segments (16) secured to it, and that an encompassing, angular chamfer (18) is made by turning into the face end of the gear housing (17) oriented toward the motor housing (13), onto which chamfer the short-circuit ring (15) is slipped with positive engagement until an annular end face of the short-circuit ring (15) meets a radial leg face (181) of the chamfer (18).

5. The drive device of claim 3, wherein the gear housing (17), in its motor housing slipped-on region, has an annular rib (24) that protrudes radially from the outer circumference, whose annular rib face forms the radial shoulder (21) and another annular rib face forms a radial extension of the radial leg face (181) of the chamfer (18).

6. The drive device of claim 5, wherein the motor housing (13), on its opening edge (131) oriented toward the gear housing (17), is radially widened and is braced on opposite annular rib faces of the annular rib (24).

7. The drive device of claim 1, wherein the gear housing (17), in the slipped-on region of the motor housing (13), has an annular groove (20) into which an encompassing annular bead (22), stamped out of the motor housing (13) by the roller-burnishing, protrudes with positive engagement.

8. The drive device of claim 1, wherein on the gear housing (17) in the motor housing slipped-on region, an encompassing radial shoulder (21) remote from the motor housing (13) is embodied, which is engaged from behind by an annular collar (23) bent inward from the motor housing (13) by the roller-burnishing.

9. The drive device of claim 2, wherein on the gear housing (17) in the motor housing slipped-on region, an encompassing radial shoulder (21) remote from the motor housing (13) is embodied, which is engaged from behind by an annular collar (23) bent inward from the motor housing (13) by the roller-burnishing.

10. The drive device of claim 1, wherein the motor housing (13) encloses a stator (14), which comprises a short-circuit ring (15) and permanent segments (16) secured to it, and that an encompassing, angular chamfer (18) is made by turning into the face end of the gear housing (17) oriented toward the motor housing (13), onto which chamfer the short-circuit ring (16) is slipped with positive engagement until an annular end face meets a radial leg face (161) of the chamfer (18).

11. The drive device of claim 2, wherein the motor housing (13) encloses a stator (14), which comprises a short-circuit ring (15) and permanent segments (16) secured to it, and that an encompassing, angular chamfer (18) is made by turning into the face end of the gear housing (17) oriented toward the motor housing (13), onto which chamfer the short-circuit ring (15) is slipped with positive engagement until annular end face meets a radial leg face (181) of the chamfer (18).

12. The drive device of claim 3, wherein the motor housing (13) encloses a stator (14), which comprises a short-circuit ring (15) and permanent segments (16) secured to it, and that an encompassing, angular chamfer (18) is made by turning into the face end of the gear housing (17) oriented toward the motor housing (13), onto which chamfer the short-circuit ring (15) is slipped with positive engagement until an annular end face meets a radial leg face (181) of the chamfer (18).

* * * * *